US012630757B1

(12) United States Patent (10) Patent No.: US 12,630,757 B1
Aung et al. (45) Date of Patent: May 19, 2026

(54) HIGH TEMPERATURE GRAVEL PACKING FLUID SYSTEM

(71) Applicant: Schlumberger Technology Corporation, Sugar Land, TX (US)

(72) Inventors: Tint Htoo Aung, Houston, TX (US); Balkrishna Gadiyar, Houston, TX (US); Juan-Carlos Santamaria, Sugar Land, TX (US); Cedric Manzoleloua, Houston, TX (US); Hui Zhang, Houston, TX (US); Edward Derkach, Houston, TX (US); Christopher Daeffler, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/074,139

(22) Filed: Mar. 7, 2025

(51) Int. Cl.
    E21B 43/04 (2006.01)
    C09K 8/575 (2006.01)

(52) U.S. Cl.
    CPC ............ C09K 8/5758 (2013.01); E21B 43/04 (2013.01); *C09K 2208/10* (2013.01)

(58) Field of Classification Search
    CPC .... C09K 8/5758; C09K 8/5751; C09K 8/575; C09K 8/57; C09K 2208/10; E21B 43/02; E21B 43/025; E21B 43/04
    See application file for complete search history.

(56) References Cited

U.S. PATENT DOCUMENTS

| | | | |
|---|---|---|---|
| 3,988,246 A | * | 10/1976 | Hartfiel .................... C09K 8/08 |
| | | | 507/926 |
| 6,258,859 B1 | | 7/2001 | Dahayanake |
| 6,300,286 B1 | * | 10/2001 | Dobson, Jr. .............. C09K 8/90 |
| | | | 507/140 |
| 6,482,866 B1 | | 11/2002 | Dahayanake |
| 6,703,352 B2 | | 3/2004 | Dahayanake |
| 6,831,108 B2 | | 12/2004 | Dahanayake |
| 7,084,095 B2 | | 8/2006 | Lee |
| 7,238,648 B2 | | 7/2007 | Dahayanake |
| 7,279,446 B2 | | 10/2007 | Colaco |
| 7,320,952 B2 | | 1/2008 | Chen |
| 7,341,980 B2 | | 3/2008 | Lee |
| 7,378,378 B2 | | 5/2008 | Chen |
| 7,387,986 B2 | | 6/2008 | Chen |

(Continued)

FOREIGN PATENT DOCUMENTS

| | | | | |
|---|---|---|---|---|
| UA | 118176 C2 | * | 12/2018 | ............. C09K 8/206 |
| WO | 2018031431 A1 | | 2/2018 | |
| WO | 2018071683 A1 | | 4/2018 | |

OTHER PUBLICATIONS

Di-Trol, retrieved Sep. 5, 2025 from https://www.slb.com/-/media/files/mi/product-sheet/di-trol-ps.pdf (Year: 2021).*

(Continued)

*Primary Examiner* — Angela M DiTrani Leff
(74) *Attorney, Agent, or Firm* — Jeffrey D. Frantz

(57) ABSTRACT

A high density carrier fluid for use in placing a gravel pack within a wellbore includes a modified starch, a magnesium oxide, and a nano-crystalline-cellulose having a median diameter of about 20 nanometers or less. The carrier fluid includes an aqueous base fluid and dissolved salts. Related methods include methods of making and using the carrier fluids.

20 Claims, 3 Drawing Sheets

(56) References Cited

U.S. PATENT DOCUMENTS

| | | | |
|---|---|---|---|
| 7,387,987 B2 | 6/2008 | Chen | |
| 7,402,549 B2 | 7/2008 | Chen | |
| 7,507,693 B2 | 3/2009 | Chen | |
| 7,565,929 B2 | 7/2009 | Bustos | |
| 7,741,252 B2 | 6/2010 | Chen | |
| 7,749,944 B2 | 7/2010 | Chen | |
| 8,822,386 B2 | 9/2014 | Quintero | |
| 8,911,591 B2 | 12/2014 | Ankerfors | |
| 9,133,384 B2 | 9/2015 | Rincon-Torres | |
| 9,200,193 B2 | 12/2015 | Laukkanen | |
| 10,351,751 B2 | 7/2019 | Brady | |
| 10,662,366 B2 | 5/2020 | Yakovlev | |
| 10,689,564 B2 | 6/2020 | Lafitte | |
| 10,815,414 B2 | 10/2020 | Panga | |
| 10,815,424 B2 | 10/2020 | Dogan | |
| 10,907,086 B2 | 2/2021 | Prakash | |
| 11,319,476 B2 | 5/2022 | Yakovlev | |
| 11,326,093 B2 | 5/2022 | Xiang | |
| 11,407,931 B2 | 8/2022 | Refunjol | |
| 11,434,417 B2 | 9/2022 | Lafitte | |
| 11,898,095 B2 | 2/2024 | Refunjol | |
| 11,939,523 B2 | 3/2024 | Xiang | |
| 2005/0101490 A1* | 5/2005 | Vollmer | C09K 8/10 507/100 |
| 2011/0053807 A1* | 3/2011 | Panga | C04B 28/02 507/217 |
| 2013/0274149 A1* | 10/2013 | Lafitte | C09K 8/74 507/112 |
| 2015/0072902 A1 | 3/2015 | Lafitte | |
| 2016/0168443 A1 | 6/2016 | Lafitte | |
| 2017/0226407 A1* | 8/2017 | Homma | C09K 8/467 |
| 2018/0044576 A1 | 2/2018 | Pantsurkin | |
| 2018/0127639 A1 | 5/2018 | Xiang | |
| 2018/0148630 A1 | 5/2018 | Yakovlev | |
| 2018/0201820 A1* | 7/2018 | Eyaa Allogo | C09K 8/08 |
| 2018/0230370 A1* | 8/2018 | Johnson | C09K 8/685 |
| 2018/0282214 A1 | 10/2018 | Xiang | |
| 2019/0008749 A1* | 1/2019 | Harris | A61K 8/731 |
| 2019/0309211 A1 | 10/2019 | Yakovlev | |
| 2020/0369938 A1* | 11/2020 | Linscombe | C09K 8/08 |
| 2022/0403228 A1 | 12/2022 | Xiang | |
| 2023/0203361 A1* | 6/2023 | Deville | C09K 8/92 507/130 |
| 2025/0034450 A1 | 1/2025 | Lafitte | |

OTHER PUBLICATIONS

Di-Balance, retrieved Sep. 5, 2025 from https://www.slb.com/-/media/files/mi/product-sheet/di-balance-ps.pdf (Year: 2021).*

Translation UA-118176-C2 (Year: 2018).*

"Comparison of Microfibrillated cellulose and Nanocrystalline cellulose", Retrieved from the internet: https://www.borregaard.com/insights/comparison-of-microfibrillated-cellulose-and-nanocrystalline-cellulose, Dec. 27, 2016, 6 Pages.

Pillai, P., et al., "Industry First Openhole Alternate Path Gravel Pack Completion in HPHT Environment: Fluid 2 Development and Case History", Society of Petroleum Engineers, Sep. 23, 2021, pp. 1-9.

* cited by examiner

HIGH TEMPERATURE GRAVEL PACKING FLUID SYSTEM

BACKGROUND OF THE DISCLOSURE

The present disclosure generally relates to techniques for gravel packing a wellbore extending through formations for sand control, formation stabilization, or formation fracturing.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Gravel packs are placed in a wellbore between a screen, slotted liner, or well casing and a formation face to prevent formation sand from flowing into the wellbore and to improve wellbore and near-wellbore conductivity. The conductivity at the wellbore and near-wellbore is important because any damage in these locations significantly increases the pressure drop of fluid flow, thereby reducing the producibility or injectivity of the well. Further, current placement techniques for gravel packs may be a complex procedure in a hostile wellbore environment.

SUMMARY

A summary of certain embodiments described herein is set forth below. It should be understood that these aspects are presented merely to provide the reader with a brief summary of these certain embodiments and that these aspects are not intended to limit the scope of this disclosure.

A composition for use in placing a gravel pack within a wellbore includes a modified starch, magnesium oxide, and a nano-crystalline-cellulose having a median diameter of about 20 nanometers or less.

A method of preparing a slurry for a gravel packing fluid includes obtaining a modified starch, a magnesium oxide, and a nano-crystalline-cellulose, and a carrier fluid, the carrier fluid comprising an aqueous base fluid and salt, mixing the modified starch, the magnesium oxide, and the nano-crystalline-cellulose into the carrier fluid to form the slurry, and suspending particles in the slurry.

A method of placing a gravel pack in a formation includes providing slurry including a carrier fluid and particles suspended in the carrier fluid, the carrier fluid comprising a modified starch, a magnesium oxide, and a nano-crystalline-cellulose, and a base fluid. The base fluid includes one or more of a salt, a water, sea water, or aqueous solution. The nano-crystalline-cellulose has a median diameter of about 20 nanometers or less. The method further includes placing the slurry within the formation to create a gravel pack.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure may be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
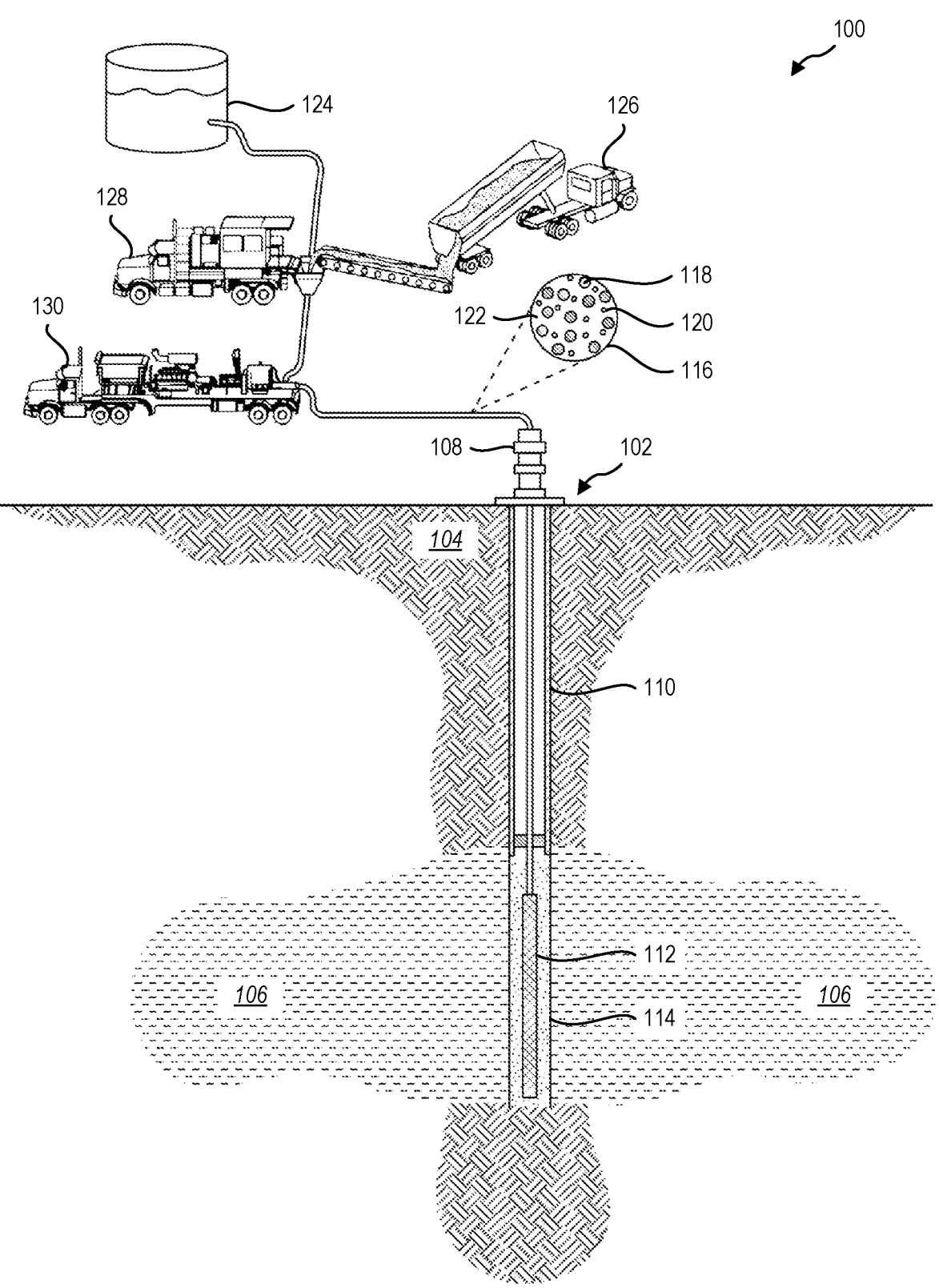
FIG. 1 is a schematic diagram of a system for a gravel packing, according to at least one embodiment of the present disclosure.

As used herein, a "barrel" means and includes a volume equivalent to 42 gallons. Quantities of various materials (e.g., additives) are often quantified in barrels in the oil and gas industry.

This disclosure generally relates to fluids, systems, and methods related to a novel carrier fluid for use in placing a gravel pack within a wellbore. A gravel pack is a sand-control method used to prevent and/or reduce the production of formation sand. In gravel pack operations, a screen (e.g., a steel screen) is placed in the wellbore and the surrounding annulus packed with prepared gravel of a specific size suspended in a carrier fluid designed to prevent and/or reduce the passage of formation sand through the gravel and the screen. The screen may maintain the gravel from entering the well while allowing wellbore fluids and produced fluids to flow therethrough. The primary objective is to stabilize the formation while causing minimal impairment to well productivity.

According to embodiments described herein, a gravel pack is placed with a gravel packing fluid comprising a slurry. The slurry includes a carrier fluid, a modified starch, and a nano-crystalline-cellulose. The gravel packing fluid may further include gravel. The carrier fluid may include an aqueous base fluid and may be configured to carry the modified starch, the nano-crystalline-cellulose, and any other additives in the gravel packing fluid to a desired location in the wellbore. The carrier fluid may also be referred to as a "base fluid." In some embodiments, the carrier fluid includes a divalent brine.

The modified starch may be formulated and configured to exhibit temperature stability at temperatures encountered within the wellbore. In some embodiments, the modified starch is stable at temperatures as high as about 65.6° C. (about 150° F.), such as higher than about 93.3° C. (about 200° F.), higher than about 121.1° C. (about 250° F.), higher than about 148.9° C. (about 300° F.), or even higher than about 176.7° C. (about 350° F.). In addition, the modified starch may be stable in the presence of divalent brines, even at the elevated temperatures. The modified starch may include starch that has been modified, such as by crosslinking. In some embodiments, the modified starch includes carboxymethyl and/or hydroxypropyl starches and is not modified by phosphate. The modified starch may be formulated and configured to thicken the slurry. In some embodiments, the modified starch increases the viscosity of the slurry. When the slurry is used in a gravel packing fluid, the modified starch may include the suspension of the gravel and other particulate materials in the gravel packing fluid, improving the performance of the gravel packing fluid.

The nano-crystalline-cellulose may exhibit synergistic properties with the modified starch in supporting the viscosity and the suspension properties of the slurry. In some embodiments, the size of the nano-crystalline-cellulose facilitates the suspension capabilities of the gravel pack slurry by creating an entangled network between the modified starch molecules through physical interaction causing the increased suspension characteristics of the disclosed slurry.

A wellbore environment may include divalent brines, such as sea water, and temperature conditions of 120° F. to 350° F. Non-limiting examples of divalent brines include calcium chloride, calcium bromide, and zinc bromide. Some carrier fluids break down in the presence of some divalent brines and/or high temperatures. A carrier fluid of this disclosure may exhibit temperature stability at temperatures within a range of from about 48.9° C. (about 120° F.) to about 176.7° C. (about 350° F.) and exposed to divalent brines. Further, the carrier fluid has a density ranging from about 14 lbm/U.S. gal (ppg) to about 17 ppg. In some applications, the carrier fluid may be equal to or exceed 15.4 ppg, in spite of the dilution effect from water and brines that may be in the surrounding formation.

The methods of the present disclosure relate to suspending gravel of desired sizes into the carrier fluid to form a slurry and then placing the slurry into a subterranean formation for sand control or stabilization. When used to form a gravel packing fluid, the slurry may further include gravel and/or other particulate materials. The slurry may be used at any time in the life cycle of a reservoir, field, or oilfield. For example, the slurry may be used during gravel packing operations. In addition, the slurry may be used during hydraulic fracturing operations.

FIG. 1 is a schematic diagram of one embodiment of a system 100 for gravel packing. In certain embodiments, the system 100 includes a well 102 drilled through an overburden 104 and a formation of interest 106. The formation of interest 106 may include a hydrocarbon producing formation, a water producing formation, a target formation for injection of a fluid, or other formation of interest known in the art. In certain embodiments, the well 102 has a wellhead 108, and a casing 110 covering at least a portion of the wellbore. In the illustration of FIG. 1, the wellbore through the formation of interest 106 is an "open hole" completion in a vertical well. Other types of completions are contemplated in the present application, including without limitation: a cased completion, multiple zone completions, and/or a horizontal well or well segment. The casing 110 may include a cement layer (not shown) between the casing 110 and the formation(s) (104, 106). Various other features of the system 100 that are known in the art are not shown or described herein to avoid obscuring aspects of the present application.

The system 100 further includes, in certain embodiments, a screen 112 disposed in the wellbore. The screen 112 may include slots or holes sized to prevent the flow of particles from the formation of interest 106 into the well 102 or to the surface during treatment flowback or production of the well 102. In certain embodiments, the system 100 includes a gravel pack 114 deposited between the screen 112 and the formation of interest 106. The gravel of the gravel pack 114 may be deposited as a portion of a slurry 116 comprising particles (118, 120) and a carrier fluid 122. The slurry may also be referred to as a "gravel packing fluid."

In certain embodiments, the slurry 116 is pumped through the well 102 to deposit a first amount of particulates 118 and a second amount of particulates 120 between the screen 112 and the formation of interest 106. The slurry 116 may be pumped outside the screen 112 into the formation of interest 106 until a screen-out occurs (i.e. the particulates 118, 120 build up to the point where the pressure drop across the gravel pack 114 prevents further pumping), the slurry 116 may be circulated through the well 102 such that the slurry 116 passes from outside the screen 112 to inside the screen 112, thereby depositing the particulates 118, 120 in the annulus between the screen 112 and the formation of interest 106 and circulating the carrier fluid 122 to the surface. In certain embodiments, the slurry 116 may be placed in the wellbore 102 and the screen 112 lowered into the already-placed slurry 116 such that the particulates 118, 120 in the slurry 116 are thereby deposited between the screen 112 and the formation of interest 106.

The system 100 may include various devices to control mixing and pumping the slurry 116. The system 100 includes at least one fluid tank 124 which contains the carrier fluid 122 and/or a base fluid utilized in the creation of the carrier fluid 122. The fluid tank 124 may be heated. A gravel carrier 126 provides particulates 118, 120 to a blending device 128. The blending device 128 prepares the final slurry 116, for example, mixing the carrier fluid 122 and adding the particulates 118, 120 from the gravel carrier 126, and further adding any additives or any other particulates. The blending device 128 further provides the slurry 116 to a pumping device 130 that provides pressurized slurry 116 to the wellhead 108.

In some embodiments, the carrier fluid may be prepared in a base fluid that includes water, sea water, brine, or a salt-containing aqueous solution. In some embodiments, the carrier fluid includes an aqueous-based fluid. By way of non-limiting example, the base fluid may include a brine including water and one or more salts (e.g., one or more organic salts and/or one or more inorganic salts). The one or more salts may provide a desired density to the drilling fluid. The salts may include salts of one or more of sodium, calcium, aluminum, magnesium, zinc, potassium, strontium, or lithium, and salts of one or more of chlorides, bromides, carbonates, iodides, chlorates, bromates, formates, nitrates, oxides, phosphates, sulfates, silicates, or fluorides. In some embodiments, the base fluid includes one or more divalent brines, such as one or more of calcium chloride, calcium bromide, or zinc bromide. In some embodiments, the base fluid includes a mixture of divalent brines including calcium chloride, calcium bromide, and zinc bromide. In some embodiments, the base fluid includes one or more of saturated cesium formate, potassium formate, and $ZnBr_2$.

The salt may constitute from about 15 weight percent to about 80 weight percent of the carrier fluid. In some embodiments, the salt may constitute from about 20 weight percent to about 75 weight percent, from about 25 weight percent to about 75 weight percent, from about 30 weight percent to about 75 weight percent, from about 35 weight percent to about 70 weight percent, from about 40 weight percent to about 55 weight percent, or from about 40 weight percent to about 50 weight percent of the carrier fluid. However, the disclosure is not so limited, and the weight percent of the salt and the water in the carrier fluid may be different than that described.

As described above, the carrier fluid may be mixed with modified starch, magnesium oxide, and a nano-crystalline-cellulose to form a slurry. The slurry develops its viscosity and sand suspension capabilities by the synergistic combination of the modified starch as the primary viscosifier, the magnesium oxide as the low shear rate viscosity (LSRV) enhancer or rheology modifier, and the nano-crystalline-cellulose, as a primary suspension aid additive. The nano-crystalline-cellulose may act as a secondary viscosity enhancer. The slurry also may include an amine-based temperature stabilizer. In some embodiments, slurry may not include phosphates, though trace amounts maybe found as contaminants. In some embodiments, the carrier fluid and the slurry are free of (e.g., substantially free of) phosphates. The modified starch may be free of phosphates. In other words, the modified starch may not include a phosphate starch and may not be crosslinked with phosphates. In some embodiments, the modified starch is free of phosphorus atoms. The slurry may further include one or more additional additives. In some embodiments, the slurry further includes gravel, such as when the slurry is used in a gravel packing fluid.

The modified starch may be derived from corn starch, potato starch, tapioca starch, or other biological source, through a cross-linking process, and may be characterized as the thickener for the slurry including a carrier fluid comprising high density divalent brine such as calcium bromide and/or zinc bromide. The modified starch may be a large heavily branched biopolymer that offers greater temperature resistance and does not have a uniform or consistent structure. In some embodiments, the modified starch may be one or more of a hydroxy propyl starch, a carboxymethyl starch, a hydroxyalkylated starch (e.g., hydroxymethyl starch, hydroxyethyl starch, hydroxypropyl starch), an acetylated starch, an acetylated distarch adipate, an acetylated oxidized starch, an octenylsuccinate-treated starch, a cationized starch, an oxidized starch, a starch sodium octenyl succinate, or a starch aluminum octenyl succinate. In some embodiments, the modified starch is modified with one or more crosslinkers and includes crosslinked starch.

In some embodiments, the modified starch includes cross-linked starch. The starch may be crosslinked with one or more crosslinkers. The one or more crosslinkers may include epichlorohydrin, cyanuric chloride, other epihalohydrins, formaldehyde, dialdehydes, oxidized sucralose, vinyl sulfone, diepoxides, diisocyanates, bis(hydroxymethyl) urea, and adipic acetic anhydride. In some embodiments, the modified starch is crosslinked with epichlorohydrin.

The modified starch may include one or more of linear saturated ester functional groups (e.g., one or more saturated fatty acid ester groups), such as one or more of starch propionate, starch butyrate, starch pentanoate, starch heptanoate, starch octanoate, starch nonanoate, starch decanoate, starch undecanoate, starch dodecanoate (starch laurate), starch tridecanoate, starch tetradecanoate, starch pentadecanoate, starch hexadecanoate, starch heptadecanoate, or starch octadecenoate; and/or one or more linear unsaturated ester functional groups (e.g., one or more unsaturated fatty acid ester groups) such as one or more of starch crotonoate, starch myristoleate, starch palmitoleate, starch oleate, starch sapienate, starch elaidate, starch linoleate, starch linolenate, starch pinolenate, or starch eleostearate. In some embodiments, the modified starch includes one or more of starch octanoate, starch decanoate, starch laurate, or starch stearate.

In some embodiments, the modified starch comprises, consists essentially of, or consists of starch laurate. In some embodiments, the modified starch comprises, consists essentially of, or consists of starch stearate. In some embodiments, the modified starch comprises, consists essentially of, or consists of starch decanoate. In some embodiments, the modified starch comprises, consists essentially of, or consists of starch octanoate. In some embodiments, the functional groups include fatty acid esters (acids of fatty acids). In some embodiments, the functional groups of the modified starch include ether groups, carboxyl groups, and/or hydroxyl groups. In some embodiments, the modified starch may be a starch that has not been modified to add phosphate groups. In some such embodiments, the modified starch is free of phosphate groups and/or phosphorus atoms.

In some embodiments, a phosphated modified starch may be used, such as a monostarch phosphate, a distarch phosphate, a phosphated distarch phosphate, acetylated distarch phosphate, and hydroxypropyl distarch phosphate. In some embodiments, a mixture of modified starches may be used. For example, the modified starch may include a first type of modified starch having a first material composition, and at least a second type of modified starch having a second material composition different than the first material composition. In some embodiments, and as described above, the modified starch may not include phosphate, may not be modified with phosphate, and/or may not include phosphorus atoms.

The modified starch may constitute from about 5.0 pounds per barrel (ppb) to about 15.0 ppb of the slurry, such as from about 5.0 ppb to about 6.0 ppb, from about 6.0 ppb to about 8.0 ppb, from about 8.0 ppb to about 10.0 ppb, from about 10.0 ppb to about 12.0 ppb, or from about 12.0 ppb to about 15.0 ppb of the slurry. In some embodiments, a concentration of the modified starch in the slurry is within a range of from about 7.0 ppb to about 9.0 ppb, such as about 8.0 ppb.

A median diameter (D50) of the modified starch may be less than about 40 microns, such as less than about 38 microns. In some embodiments, a D75-90 may refer to a median particle size of the modified starch below which more than about 75 percent or about 90 percent of the total volume of the modified starch is present. The D75-90 of the modified starch may be about 51 microns or less. In some embodiments, the D75-90 of the modified starch may be about 110 microns or less. In some embodiments, the median diameter (D50) of the modified starch is about 110 microns. In some embodiments, about 94 percent (e.g., by weight) of the modified starch passes through a screen having openings having a diameter of about 105 microns.

The density of the brine mixture may be 15.4 ppg and above, which may be achieved by blending salts into the carrier fluid (e.g., blending calcium bromide and zinc bromide at ratios in a water or brine). The thickening process is aided by the application of heat either sourced through an exothermic reaction of dissolving calcium bromide and/or calcium chloride salt in water or brine or through the application of heat, such as may be provided by heating truck or other heating source.

The magnesium oxide may have a median diameter (e.g., D50) less than about 20 microns in diameter. In other embodiments, the magnesium oxide may have a median diameter less than about 15 microns in diameter. In yet other embodiments, the magnesium oxide may have a median diameter less than about 10 microns in diameter. In some embodiments, the median diameter of the magnesium oxide is about 5 microns or smaller. The magnesium oxide may act as a pH buffer as well.

The magnesium oxide may constitute from about 2.0 ppb to about 12.0 ppb of the slurry, such as from about 2.0 ppb to about 3.0 ppb, from about 3.0 ppb to about 4.0 ppb, from about 4.0 ppb to about 5.0 ppb, from about 5.0 ppb to about 6.0 ppb, from about 6.0 ppb to about 8.0 ppb, from about 8.0 ppb to about 10.0 ppb, or from about 10.0 ppb to about 12.0 ppb of the slurry. In some embodiments, a concentration of the magnesium oxide in the slurry is within a range of from about 7.0 ppb to about 9.0 ppb, such as about 8.0 ppb.

In some embodiments, the slurry further contains an amine-based temperature stabilizer to assist in the crosslinking of the magnesium oxide with the modified starch. The amine-based temperature stabilizer may facilitate crosslinking of the modified starch, facilitating the use of the magnesium oxide as a rheology modifier to improve the viscosity and the ability of the slurry to hold sand and gravel suspended within the slurry at the bottomhole temperature. For example, crosslinking of the modified starch, which may be improved and/or caused by the magnesium oxide, may increase the viscosity of the slurry including the modified starch.

Nano-crystalline-cellulose may be exceptionally tough, with a strong axial Young's modulus (150 GPa) and may have a morphology and crystallinity like the original cellulose fibers. In some embodiments, the degree of crystallinity may vary from about 50% to about 100%, about 65% to about 100%, or about 70% to about 100% by weight. In some embodiments, the degree of crystallinity is from about 85% to about 100% or may range from about 88% to about 95% by weight. The nano-crystalline-cellulose may have a particle size in the range of about 2 nanometers (nm) to about 20 nanometers.

In some embodiments, the nano-crystalline-cellulose has a spherical shape or generally cylindrical shape (e.g., rod shape). In some embodiments, a largest dimension (e.g., a diameter) of the nano-crystalline-cellulose is within a range of from about 2.0 nm to about 20.0 nm, such as from about 2.0 nm to about 5.0 nm, from about 5.0 nm to about 10.0 nm, from about 10.0 nm to about 15.0 nm, or from about 15.0 nm to about 20.0 nm. In some embodiments, the nano-crystalline-cellulose includes distinct particles of nano-crystalline-cellulose and does not form agglomerations of the nano-crystalline-cellulose.

The nano-crystalline-cellulose may constitute from about 0.5 ppb to about 12.0 ppb of the slurry, such as from about 0.5 ppb to about 10.0 ppb, from about 0.7 ppb to about 8.0 ppb, from about 1.0 ppb to about 6.0 ppb, or from about 0.4 ppb to about 2.0 ppb of the slurry.

Nano-crystalline-cellulose has better suspension characteristics within divalent brines than microfiber cellulose. It is believed that due to the nano size of nano-crystalline-cellulose, the nano-crystalline-cellulose in the carrier fluid does not settle as much over time as the larger microfiber cellulose. Further, it is believed that the nano-crystalline-cellulose creates an entangled network between the modified starch molecules through physical interaction causing the increased suspension characteristics of the disclosed slurry. In other words, the combination of the nano-crystalline-cellulose and the modified starch synergistically forms an entangled network of the modified starch molecules and the nano-crystalline-cellulose, increasing the suspension properties of the slurry including the nano-crystalline-cellulose and the modified starch.

When mixed, the modified starch may correspond to from about 0.5 to about 15 pounds per barrel. In some embodiments, the concentration of the modified starch in the slurry is about 8 pounds per barrel.

In some embodiments, the slurry is used in a gravel packing fluid. The gravel packing fluid may include the slurry and one or more particulates, such as gravel. The gravel may include one or more of any particulate material used to filter sand or other similar particulate solids from the production fluid or other such produced fluids. Examples of gravel may include sand, ceramics, and type of proppant, or any type of sized solid particulate. The gravel may be pre-sized to a specific desirable size. If a screen is used, the gravel may be sized at a size greater than the screen apertures. The gravel may have a size in the range of about 0.0083 inch to about 0.0661 inch. Alternately, the gravel may have a size of 12/18, 16/30, 20/40, 30/50, or 40/70 US mesh, but is not limited to such sizes. The gravel may be included in the gravel packing fluids in an amount in a range of about 0.5 pounds per gallon to about 10 pounds per gallon, alternatively about 1 pound per gallon to about 7 pounds per gallon, alternatively about 2 pounds per gallon to about 4 pounds per gallon, or about 6 pounds per gallon, 7 pounds per gallon, or 8 pounds per gallon.

As described above, in addition to the modified starch, the nano-crystalline-cellulose, and the magnesium oxide, the slurry may further include one or more additives. The one or more additives may include one or more of thermal stabilizers, gel breakers, non-emulsifiers, iron control agents, pH buffers, surfactants biocides, bridging materials, viscosifiers, thinners (e.g., dispersion aids), weighting materials, filtration control materials, emulsifiers, corrosion inhibitors, emulsion activators, gelling materials, shale inhibitors, defoamers, surfactants, foaming materials, scale inhibitors, solvents, rheological additives, or other additives.

Thermal stabilizers may include one or more of non-sulfur antioxidants that increase the thermal stability of the slurry. The thermal stabilizers may include, for example, ascorbic acid, any salt of ascorbic acid (e.g., sodium ascorbate), erythorbic acid, any salt of erythorbic acid (e.g., sodium erythorbate), tocopherol, any derivative thereof, and any combination thereof. The thermal stabilizers may be included in the slurry in an amount within a range of from about 0.005 ppg to about 0.250 ppg, such as from about 0.010 ppg to about 0.050 ppg, from about 0.025 ppg to about 0.100 ppg, or from about 0.150 ppg to about 0.250 ppg. However, the disclosure is not so limited, and the concentration of the thermal stabilizers in the slurry may be different than those described.

Gel breakers may include oxidizers, such as sodium bromate, sodium chlorate, or magnesium dioxide. The gel breaker may be present in the slurry at a concentration within a range of from about 0.001 volume percent to about 0.50 volume percent of the slurry, such as from about 0.001 volume percent to about 0.10 volume percent, from about 0.10 volume percent to about 0.30 volume percent, or from about 0.30 volume percent to about 0.50 volume percent of the slurry. However, the disclosure is not so limited, and the concentration of the gel breakers in the slurry may be different than those described.

Non-emulsifiers may include ionic and nonionic surfactants, foaming agents, and the like. The non-emulsifiers may be present in the slurry at a concentration within a range of from about 1.0 volume percent to about 10.0 volume percent of the slurry, such as from about 1.0 volume percent to about 3.0 volume percent, from about 3.0 volume percent to about 5.0 volume percent, or from about 5.0 volume percent to about 10.0 volume percent of the slurry. However, the disclosure is not so limited, and the concentration of the non-emulsifiers in the slurry may be different than those described.

Iron control agents may include reducing agents and chelates; specific examples may include but are not limited to citric acid, sodium citrate, potassium citrate, acetic anhydride. The iron control agents may be present in the slurry at a concentration within a range of from about 0.10 volume percent to about 1.0 volume percent of the slurry, such as from about 0.10 volume percent to about 0.30 volume percent, from about 0.30 volume percent to about 0.50 volume percent, or from about 0.50 volume percent to about 1.0 volume percent of the slurry. However, the disclosure is not so limited, and the concentration of the iron control agent in the slurry may be different than those described.

The pH buffers may include bases, chelating agents, acids, or combinations of chelating agents and acids or bases.

Figure 2:
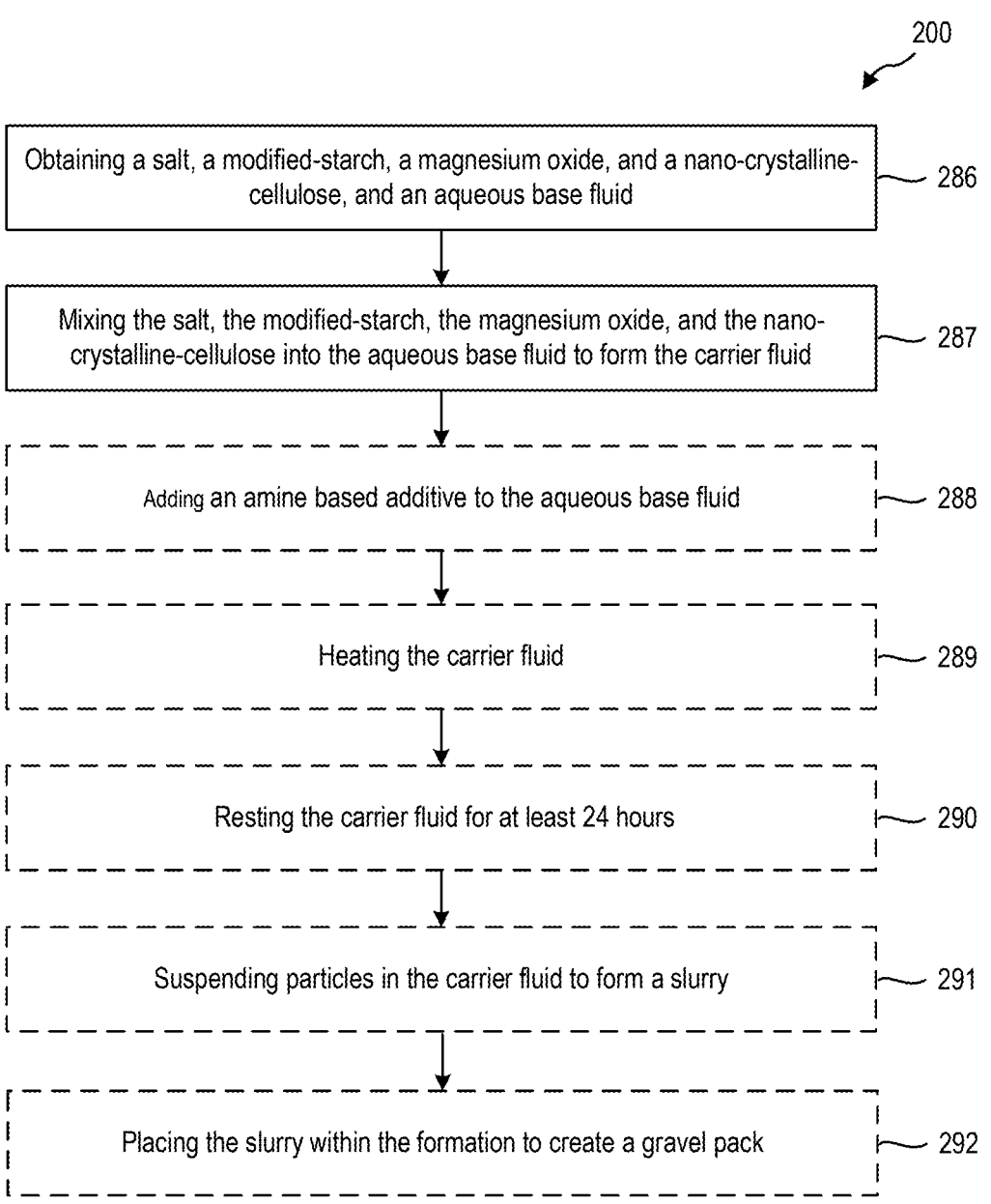
FIG. 2 is a flow chart of a method for preparing a carrier fluid and using the carrier fluid in a gravel pack, according to at least one embodiment of the present disclosure.

FIG. 2 is a flow chart of a method 200 for preparing a carrier fluid and using the carrier fluid in a gravel pack. The method includes obtaining a salt, a modified starch, a magnesium oxide, and a nano-crystalline-cellulose, and an aqueous base fluid at 286. Next, the salt, the modified starch, the magnesium oxide, and the nano-crystalline-cellulose are mixed into the aqueous base fluid to form the carrier fluid are mixed at 287. Optionally, an amine-based additive is added to the aqueous base fluid at 288. Optionally, the carrier fluid may be heated at 289. Optionally, the carrier fluid may be rested for at least 24 hours to allow the carrier fluid to increase in viscosity at 290. Optionally, particles may be suspended in the carrier fluid to form a slurry at 291. Optionally, the slurry may be placed within a formation to create a gravel pack at 292.

EXAMPLES

A carrier fluid having a density of about 16.1 pounds per gallon was prepared. The carrier fluid included 173.54 pounds per barrel, 1.35 pounds per barrel of nano-crystalline-cellulose, 250 pounds per barrel of zinc bromide having a density of 19.2 pounds per gallon, 233.24 pounds per barrel of dry calcium bromide, 8 pounds per barrel of modified starch, 8 pounds per barrel of magnesium oxide, and 2 pounds per barrel of a polymer temperature stabilizer. After aging 96 hours at 75° F., the carrier fluid had a rheology profile of 226 lb/100 ft$^2$ at 600 rpm, 150 lb/100 ft$^2$ at 300 rpm, 119 lb/100 ft$^2$ at 200 rpm, 83 lb/100 ft$^2$ at 100 rpm, 31 lb/100 ft$^2$ at 6 rpm, and 27 lb/100 ft$^2$ at 3 rpm. The aged carrier fluid had a plastic viscosity 76 cP, a yield point of 74 lb/100 ft$^2$, and a low shear yield point of 23 lb/100 ft$^2$. The carrier fluid exhibited excellent sand suspension (<20% sand settling) at temperatures at about 300 °F°or below. The following properties in Table 1 were found during testing of this embodiment.

TABLE 1

| Rheological Properties Fluid Status | | | | |
| --- | --- | --- | --- | --- |
| Aging Status | | Initial | ASA | ASA |
| Aging Time | hours | | 24 | 96 |
| Aging Temperature | ° F. | | 75 | 75 |
| Aging Mode | D/S | | S | S |
| Rheology | Units | 120° F. | 120° F. | 120° F. |
| 600 rpm | lb/100 ft$^2$ | 126 | 177 | 226 |
| 300 rpm | lb/100 ft$^2$ | 77 | 115 | 150 |

TABLE 1-continued

| Rheological Properties Fluid Status | | | | |
| --- | --- | --- | --- | --- |
| Aging Status | | Initial | ASA | ASA |
| 200 rpm | lb/100 ft$^2$ | 58 | 89 | 119 |
| 100 rpm | lb/100 ft$^2$ | 36 | 60 | 83 |
| 6 rpm | lb/100 ft$^2$ | 6 | 17 | 31 |
| 3 rpm | lb/100 ft$^2$ | 4 | 13 | 27 |
| Gel 10 sec | lb/100 ft$^2$ | 4 | 14 | 27 |
| Gel 10 mins | lb/100 ft$^2$ | 7 | 24 | 34 |
| PV | cP | 49 | 62 | 76 |
| YP | lb/100 ft$^2$ | 28 | 53 | 74 |
| LSYP | lb/100 ft$^2$ | 2 | 9 | 23 |
| pH/Temp (° F.) | | 5.1 | 5.1 | 5.1 |

Figure 3:
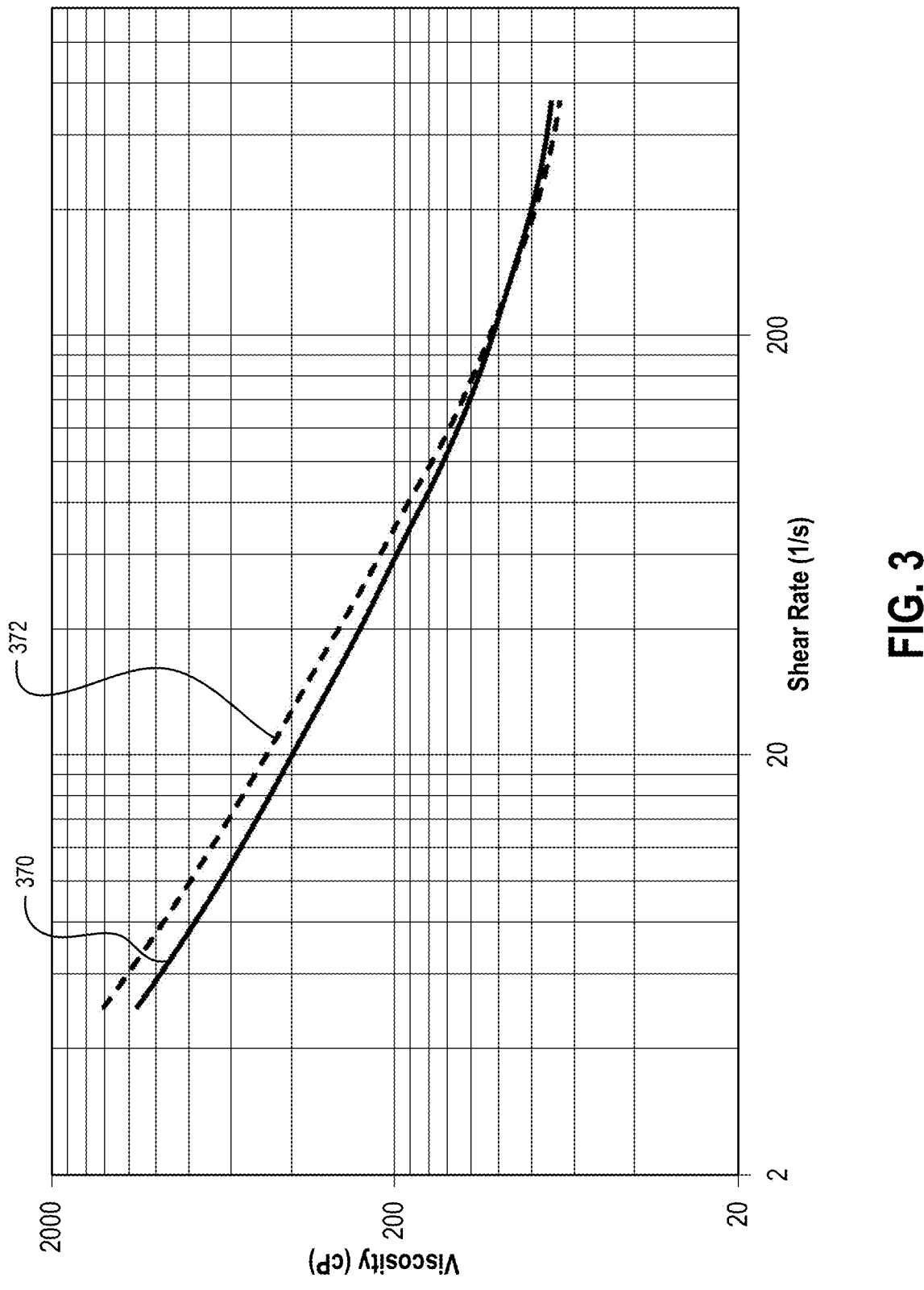
FIG. 3 is a graph illustrating the viscosity profiles for the carrier fluid determined during optimized sand suspension testing at 250° F. and 280° F. on a 5-L mix fluid sample with a <20% sand settling in 30 minutes at bottomhole temperature, according to at least one embodiment of the present disclosure.

FIG. 3 is a graph illustrating the viscosity profiles for this embodiment of the carrier fluid at 250° F. illustrated at 370 and the carrier fluid at 280° F. illustrated at 372 on a 5-L mix fluid sample. As shown, this embodiment demonstrates superior viscosity at temperatures of 250° F. and 280° F. Further, this embodiment of the carrier fluid may be used in wellbore environments where divalent brines may be present.

In general, the carrier fluid may include a modified starch, a magnesium oxide, and a nano-crystalline-cellulose. The nano-crystalline-cellulose may have a median diameter of about 40 nanometers or less. In some embodiments, the nano-crystalline-cellulose may have a median diameter of about 30 nanometers or less. In others, the nano-crystalline-cellulose may have a median diameter of about 20 nanometers or less.

The nano-crystalline-cellulose may have a degree of crystallinity ranging from about 50% to about 100%. In some embodiments, the nano-crystalline-cellulose may have a degree of crystallinity ranging from about 70% to about 100%. In others, nano-crystalline-cellulose may have a degree of crystallinity ranging from about 80% to about 100%.

The modified starch may have a median particle size of about 120 microns or less. In other embodiments, the modified starch may have a median particle size of about 105 microns or less. In some embodiments, the modified starch may have a median particle size of about 51 microns or less. In some embodiments, the modified starch may have a median particle size of about 38 microns or less.

The magnesium oxide may have a median diameter of about 40 microns or less. In some embodiments, the magnesium oxide may have a median diameter of about 30 microns or less. In other embodiments, the magnesium oxide may have a median diameter of about 20 microns or less.

When prepared, the carrier fluid may include an aqueous base fluid sourced from water, sea water, waste water, recycled water, depleted in situ aqueous based mining fluid, or other brines. The carrier fluid may include the aqueous base fluid in quantities comprising between about 100 ppb to about 300 ppb. In some embodiments, the aqueous base fluid may comprise between about 100 ppb to about 185 ppb.

The carrier fluid may include the modified starch in quantities comprising between about 5 ppb to about 15 ppb, the magnesium oxide comprising between about 2 ppb to about 12 ppb, and the nano-crystalline-cellulose comprising between about 0.5 ppb to about 10 ppb. The carrier fluid may further include a salt comprising between about 250 ppb to about 700 ppb. In some embodiments, the salt includes one or more of calcium chloride, calcium bromide, and zinc bromide. In some embodiments, the carrier fluid may include calcium bromide dry salt comprising between about 100 ppb to about 350 ppb, and zinc bromide comprising between about 150 ppb to about 350 ppb. Further, the carrier fluid may include an amine-based additive, such as an amine-based temperature stabilizer. The amine-based additive may comprise between about 0.5 ppb to about 8 ppb of the carrier fluid. The carrier fluid may also include other additives (e.g., one or more of bridging materials, viscosifiers, thinners (e.g., dispersion aids), weighting materials, filtration control materials, pH buffers, emulsifiers, corrosion inhibitors, emulsion activators, gelling materials, shale inhibitors, defoamers, surfactants, foaming materials, scale inhibitors, solvents, rheological additives, or other additives).

A method of preparing a carrier fluid may include obtaining a salt, a modified starch, a magnesium oxide, and a nano-crystalline-cellulose, and an aqueous base fluid. Next, the method may include mixing the salt, the modified starch, the magnesium oxide, and the nano-crystalline-cellulose into the aqueous base fluid to form the carrier fluid and heating the carrier fluid. The carrier fluid may be heated when the salt is dissolved into the aqueous base fluid through exothermic heating. The carrier fluid may be heated for a desired period of time to assist in dissolving the components of the carrier fluid in the aqueous base fluid. Additionally, or alternatively to exothermic heating, the carrier fluid may be heated by its own exothermic reactions.

The method may also include adding an amine-based additive to induce cross linking of the magnesium oxide with the modified starch. As noted, the amine-based additive may also be an amine-based temperature stabilizer. The method may also include adding other additives (e.g., one or more of bridging materials, viscosifiers, thinners (e.g., dispersion aids), weighting materials, filtration control materials, pH buffers, emulsifiers, corrosion inhibitors, emulsion activators, gelling materials, shale inhibitors, defoamers, surfactants, foaming materials, scale inhibitors, solvents, rheological additives, or other additives) to the aqueous base fluid.

Once mixed, the carrier fluid may be rested for at least 24 hours to allow the carrier fluid to increase in viscosity. In some embodiments, the carrier fluid is allowed to rest for about 48 hours or more to allow the carrier fluid to increase in viscosity prior to insertion into a formation or for use in gravel packing.

The method may also include suspending particles in the carrier fluid. The particles are different sizes of gravel and in some embodiments, the particles may include sand, cement, silica grout, a clay, a bentonite, a polymeric superabsorbent, an epoxy, a curable resin, a waste agricultural product, a wood product, a precipitating salt, a calcium carbonate, a wax, a ground rubber, an asphalt, plastic beads, a thermoplastic, a thermoset plastic, or a mixture of different materials.

Once the carrier fluid is prepared and the desired particles have been suspended in the carrier fluid, the carrier fluid may be referred to as a slurry. The slurry may be pumped into a wellbore and placed at a desired location within the wellbore and the formation to create a gravel pack.

The described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A composition for use in placing a gravel pack within a wellbore, the composition comprising:
- a modified starch having a concentration between about 5 pounds per barrel (ppb) and about 15 ppb;
- magnesium oxide;
- a nano-crystalline-cellulose having a median diameter of about 20 nanometers or less, the nano-crystalline-cellulose having a concentration between about 0.5 ppb and about 12 ppb;
- an aqueous carrier fluid including at least one salt, wherein the at least one salt includes two or more of calcium chloride, calcium bromide, or zinc bromide; and
- gravel having a concentration between about 0.5 pounds per gallon and about 10 pounds per gallon.

2. The composition of claim 1, wherein the magnesium oxide has a concentration between about 2 ppb and about 12 ppb.

3. The composition of claim 1, wherein the at least one salt has a concentration between about 250 ppb and about 700 ppb and a water of the aqueous carrier fluid has a concentration between about 140 ppb and about 225 ppb.

4. The composition of claim 1, wherein the gravel has a concentration of about 2 pounds per gallon to about 4 pounds per gallon.

5. The composition of claim 1, wherein the modified starch has a median particle size of about 120 microns or less.

6. The composition of claim 1, wherein the magnesium oxide has a median diameter of about 20 microns or less.

7. The composition of claim 1, wherein the nano-crystalline-cellulose has a degree of crystallinity ranging from about 50% to about 100%.

8. The composition of claim 1, further comprising an amine-based additive, the amine-based additive having a concentration between about 0.5 ppb and about 8 ppb.

9. The composition of claim 8, wherein the amine-based additive is an amine-based temperature stabilizer.

10. A method of preparing a slurry for a gravel packing fluid, the method comprising:
- obtaining a modified starch, a magnesium oxide, a nano-crystalline-cellulose having a median diameter of about 20 nanometers or less, and a carrier fluid, the carrier fluid comprising an aqueous base fluid and at least one salt, wherein the at least one salt includes two or more of calcium chloride, calcium bromide, or zinc bromide;
- mixing the modified starch, the magnesium oxide, and the nano-crystalline-cellulose into the carrier fluid to form the slurry, the modified starch having a concentration between about 5 pounds per barrel (ppb) and about 15 ppb and the nano-crystalline cellulose having a concentration between about 0.5 ppb and about 12 ppb; and
- suspending particles in the slurry, the particles including gravel having a concentration between about 0.5 pounds per gallon and about 10 pounds per gallon.

11. The method of claim 10, further comprising:
- heating the carrier fluid; and
- resting the carrier fluid for at least 24 hours.

12. The method of claim 10, wherein:
- the at least one salt has a concentration between about 250 ppb and about 700 ppb; and
- the magnesium oxide has a concentration between about 2 ppb and about 12 ppb.

13. The method of claim 10, wherein the modified starch has a median particle size of about 110 microns or less, the magnesium oxide has a median diameter of about 20 microns or less, and the nano-crystalline-cellulose has a median diameter of about 20 nanometers or less.

14. The method of claim 10, wherein the nano-crystalline-cellulose has a degree of crystallinity ranging from about 50% to about 100%.

15. The method of claim 10, wherein the gravel is present in a concentration between about 2 pounds per gallon and about 4 pounds per gallon.

16. The method of claim 10, further comprising adding an amine-based additive to the aqueous base fluid, the amine-based additive having a concentration between about 0.5 ppb and about 8 ppb.

17. The method of claim 16, wherein the amine-based additive is an amine-based temperature stabilizer.

18. A method of placing a gravel pack in a formation, the method comprising:
- providing slurry including a carrier fluid and particles suspended in the carrier fluid, the carrier fluid comprising a modified starch, a magnesium oxide, a nano-crystalline-cellulose having a median diameter of about 20 nanometers or less, and a base fluid, the base fluid comprising at least one salt and one or more of a water, sea water, or aqueous solution, wherein the at least one salt includes at least two of calcium chloride, calcium bromide, or zinc bromide, and wherein the modified starch has a concentration between about 5 pounds per barrel (ppb) and about 15 ppb, the nano-crystalline-cellulose has a concentration between about 0.5 ppb and about 12 ppb, and the particles include gravel having a concentration between about 0.5 pounds per gallon and about 10 pounds per gallon; and
- placing the slurry within the formation to create a gravel pack.

19. The method of claim 18, wherein the slurry further comprises an amine-based temperature stabilizer, the amine-based temperature stabilizer having a concentration between about 0.5 ppb and about 8 ppb;
- the at least one salt has a concentration between about 250 ppb and about 700 ppb; and
- the magnesium oxide has a concentration between about 2 ppb and about 12 ppb.

20. The method of claim 18, wherein the modified starch has a median particle size of about 110 microns or less and the magnesium oxide has a median diameter of about 20 microns or less.

* * * * *